United States Patent [19]

Ganguly

[11] Patent Number: 4,675,606

[45] Date of Patent: Jun. 23, 1987

[54] MAGNETOMETERS FOR DETECTING METALLIC OBJECTS IN EARTH'S MAGNETIC FIELD

[76] Inventor: Suman Ganguly, P.O. Box 7033, Falls Church, Va. 22046

[21] Appl. No.: 759,873

[22] Filed: Jul. 29, 1985

[51] Int. Cl.⁴ ................. G01R 33/02; G01V 3/08; G01V 3/00

[52] U.S. Cl. .................................. 324/244; 324/345

[58] Field of Search .............. 324/244, 345, 326; 340/850; 364/576; 343/5 FT, 7.7, 465

[56] References Cited

U.S. PATENT DOCUMENTS

| | | | |
|---|---|---|---|
| 2,406,870 | 9/1946 | Vacquier | 324/255 |
| 2,415,808 | 2/1947 | Buckley | 324/67 |
| 2,519,094 | 8/1950 | Zuschlag | 324/257 |
| 2,549,845 | 4/1951 | Mouzon et al. | 324/244 |
| 3,324,385 | 6/1967 | Hings | 324/345 |
| 3,644,825 | 2/1972 | Davis, Jr. et al. | 324/207 |
| 4,309,659 | 11/1982 | Yoshii | 324/345 |

*Primary Examiner*—Ernest F. Karlsen
*Assistant Examiner*—Walter E. Snow
*Attorney, Agent, or Firm*—David B. Newman, Jr.

[57] ABSTRACT

A passive system for detecting the position and trajectory of a moving body, moving in the air, on the ocean or below the ocean. This apparatus operates by detecting perturbations in the earth's magnetic field responsive to the movement of a body through the field. At least two spaced magnetometers are provided to detect the perturbations of the earth's magnetic field, whereas, the system works more efficiently with an array of sensors. These two sensors are used to filter out the ambient noise. The outputs of these sensors are digitized and inverted through correlation procedures and an output is provided on a display.

3 Claims, 5 Drawing Figures

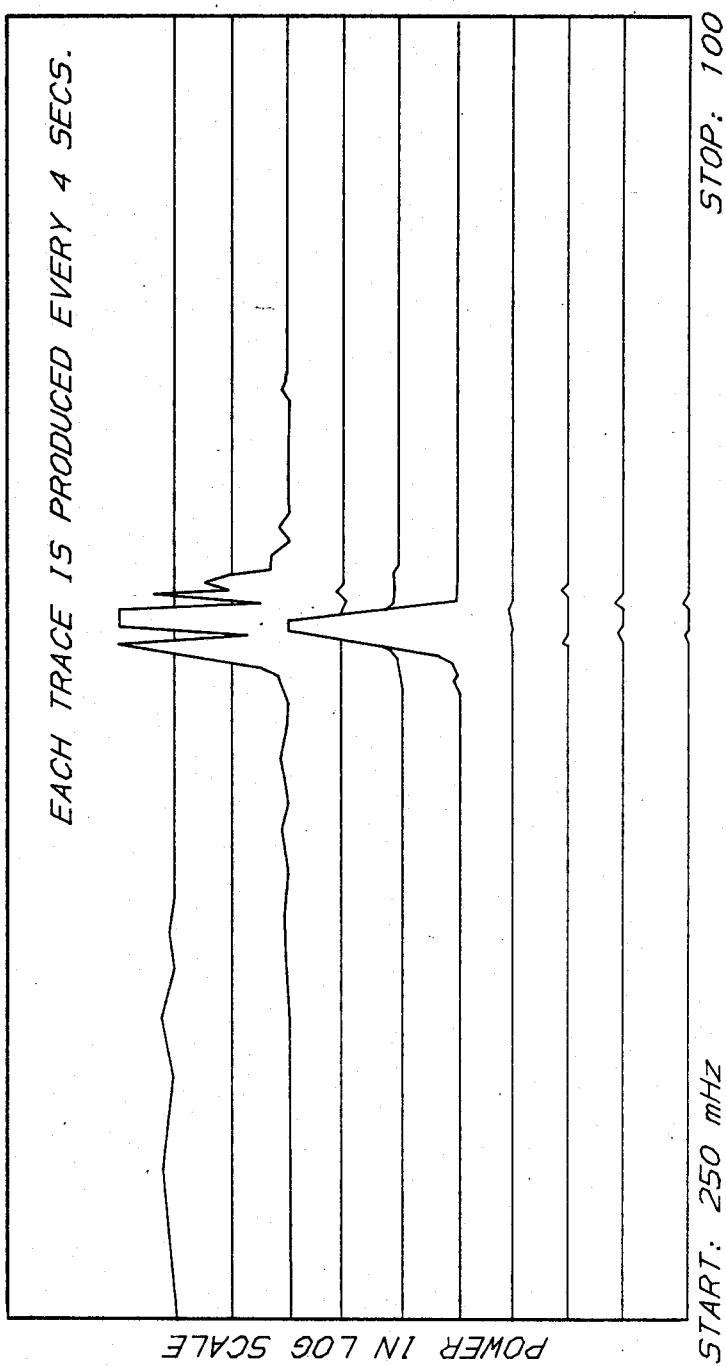

MAGNETOMETERS FOR DETECTING METALLIC OBJECTS IN EARTH'S MAGNETIC FIELD

BACKGROUND OF THE INVENTION

This invention relates to detecting electrically and magnetically conducting objects moving in the earth's magnetic field by sensing small fluctuations in the magnetic field.

DESCRIPTION OF THE PRIOR ART

Magnetic sensors are well known for detecting the presence of large magnetic bodies such as submarines. When a large magnetic body is in the vicinity a a sensing device, the change in the relative strength and shape of the earth's magnetic field is sensed. U.S. Pat. No. 2,415,808 to Buckley describes a device for detecting the presence of large magnetic bodies having hulls of magnetic material. U.S. Pat. No. 2,549,845 to Mouzon et al. describes a magnetic submarine detector provided with two coils used to measure the change of the earth's magnetic field based upon the presence of a magnetic body.

The prior art does not teach means for detecting non-magnetic bodies by measuring perturbations in the earth's magnetic field. The prior art lacks the combination of highly sensitive detectors and ionospheric and atmospheric noise reduction units which are required for measuring perturbations in the earth's magnetic field of non-magnetic objects moving in the earth's magnetic field.

OBJECTS AND SUMMARY OF THE INVENTION

An object of the present invention is to provide an apparatus for detecting electrically and magnetically conducting objects moving in the earth's magnetic field.

According to the present invention, as embodied and broadly described herein, an apparatus for detecting electrically conducting objects moving in the earth's magnetic field is provided comprising first and second magnetic field sensors, first and second analog to digital converters coupled to the first and second magnetic field sensors, first and second means for generating first and second complex Fourier transform data signals coupled to the first and second analog to digital converters, means for spatially Fourier transforming the first and second Fourier transform data signals into a spatially correlated noise power data signal, means for subtracting the spatially correlated noise power signal from the first and second Fourier transform data signals to produce a signature data signal and means for displaying the signature data signal. The first and second magnetic field sensors have sensitivities of about $10^{-10}$ Gauss/(Hz)$^{\frac{1}{2}}$, and generate first and second signals having amplitude and phase components. The second magnetic field sensor is spaced tens of kilometers from the first magnetic field sensor.

First and second means for generating first and second Fourier transform data signals can include a processing unit having a fast Fourier transform algorithm. Means for temporally and spatially Fourier transforming can include a processing unit having a fast Fourier transform algorithm. Means for displaying includes a display unit.

The invention also can be embodied as an apparatus for detecting electrically conducting objects moving in the earth's magnetic field comprising first and second magnetic field sensors, first and second analog to digital converters coupled to the first and second magnetic field sensors, first and second means for generating first and second Fourier transform data signals coupled to the first and second analog to digital converters, means for spatially cross-correlating the first and second Fourier transform data signals to generate temporally and spatially correlated noise power data signal, means for subtracting the spatially correlated noise power data signal from the first and second Fourier transform data signals to produce a signature data signal and means for displaying the signature data signal. An algorithm to study the temporal and spatial histories of the signature data signal is also provided in the subtracting unit. The first and second magnetic field sensors have sensitivities of about $10^{-10}$ Gauss/(Hz)$^{\frac{1}{2}}$, and generate first and second signals having amplitude and phase components. The second magnetic field sensor is spaced tens of kilometers from the first magnetic field sensor. First and second means for generating first and second Fourier transform data signals can include a processing unit having a fast Fourier transform algorithm. Means for spatially cross-correlating can include a processing unit having a cross-correlation or coherence function determination algorithm. Means for displaying includes a display unit.

Additional objects and advantages of the invention will be set forth in part in the description which follows, and in part will be obvious from the description, or may be learned by practice of the invention.

BRIEF DESCRIPTION OF THE DRAWINGS

The accompanying drawings, which are incorporated in and constitute a part of this specification, illustrate a preferred embodiment of the invention and, together with the description, serve to explain the principles of the invention.

FIG. 5 shows a signature signal at 6.25 Hz.

DETAILED DESCRIPTION OF THE PREFERRED EMBODIMENTS

Reference will now be made in detail to the present preferred embodiments of the invention, examples of which are illustrated in the accompanying drawings.

Figure 1:
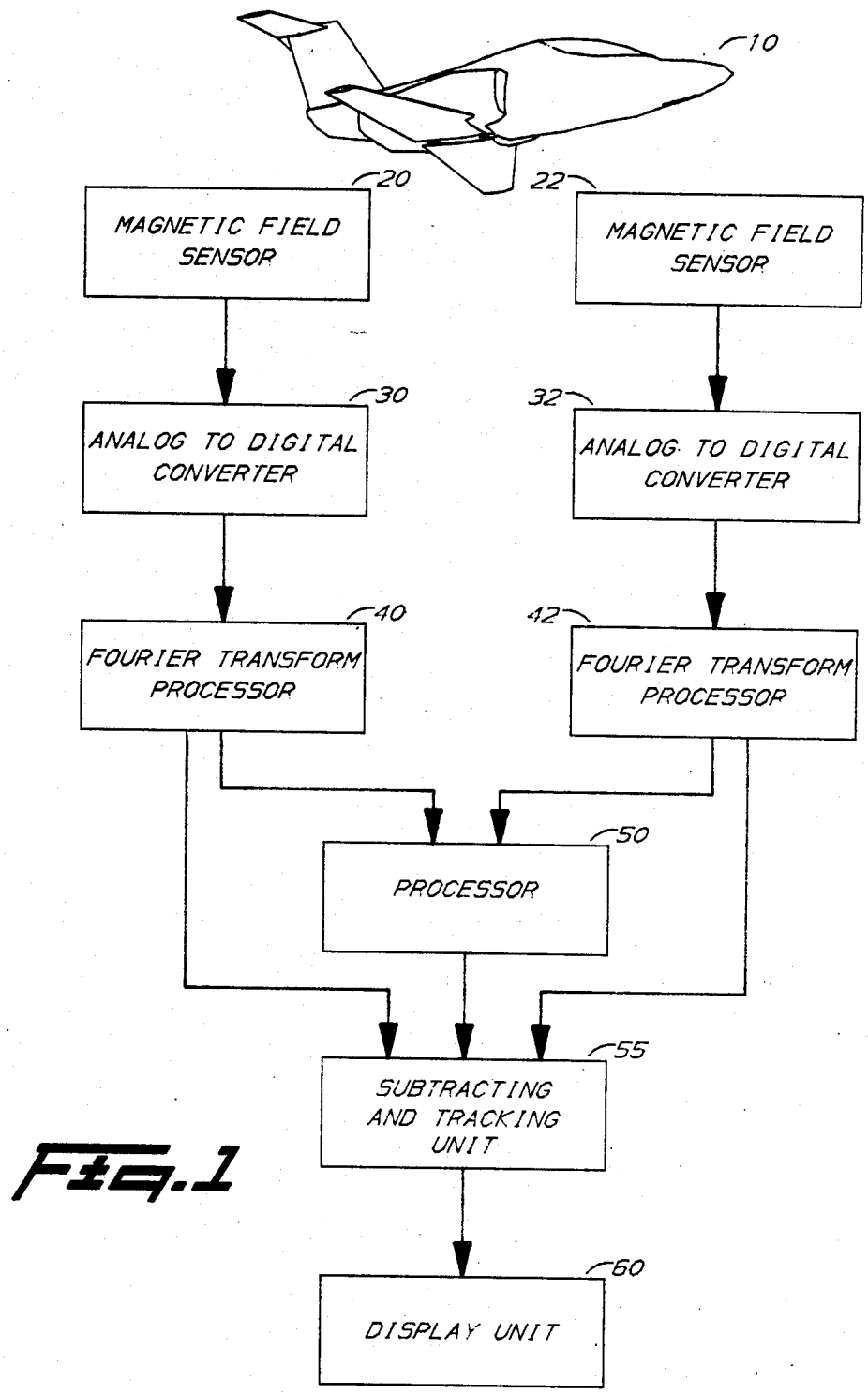
FIG. 1 is a block diagram of the apparatus of the present invention.

Referring to FIG. 1, a preferred embodiment of an apparatus for detecting an electrically conducting object moving in the earth's magnetic field is shown comprising first and second magnetic field sensors 20, 22, first and second analog to digital converters 30, 32, first and second means for generating first and second complex Fourier transforms, spatial Fourier transforming means, subtracting and tracking means and display means. In the exemplary arrangement shown, first and second means for generating first and second Fourier transforms can be embodied, for example, as processing units 40, 42 having a fast Fourier transform algorithm included therein. Spatial Fourier transform means can be embodied as a processor 50 having a spatial fast Fourier transform algorithm. Subtracting and tracking means can be embodied as subtracting unit 55 where the temporal and spatial histories are stored and analyzed for consistency. Display means can be embodied as diplay unit 60.

First and second magnetic field sensors 20, 22 are coupled to first and second analog to digital converters 30, 32, respectively. First and second analog to digital converters 30, 32 are coupled to processors 40, 42, respectively. Processsors 40, 42 are coupled to processor 50. Processors 40, 42, 50 are coupled to subtracting and tracking unit 55. Subtracting and tracking unit 55 is coupled to display unit 60.

Magnetic field sensors 20, 22 have sufficient sensitivity for detecting perturbations in the earth's magnetic field from an induced magnetic field of a current flowing on an electrically conducting object 10. The current flowing on the electrically conducting object 10 is caused by an induced potential across the electrically conducting object 10 due to the velocity of the electrically conducting object 10 moving in the earth's magnetic field and due to time varying components of the magnetic field. The induced potential V across the electrically conducting object is $$V = \int \frac{dB}{dt} \cdot ds + \int U \times B \cdot dl \quad (1)$$

where
U is the velocity of electrically conducting object 10;
B is earth's magnetic field density;
ds is differential element of surface of electrically conducting object 10;
dl is differential element of length of electrically conducting object 10;
dt is differential element of time.

More particularly, the present invention works on the following principles. Any electrically or magnetically conducting object moving in the earth's magnetic field will produce some distortion in the earth's ambient electric and magnetic field patterns. Internal motions such as turbines, propellors, etc. will produce additional field perturbations. Radiation from the electrical system inside the object may also contribute significantly. As an example, an object moving in the earth's magnetic field, B, of 0.5 Gauss will have $5 \times 10^{-5}$ U·l·volts across it, where U is the component of velocity perpendicular to the earth's magnetic fields and l the dimension of the electrically conducting object perpendicular to both B and U. For an object having a dimension l of 10 meters and moving at a velocity of 600 mph, approximately 0.2 volts will be produced across it. The resistance across the object is determined by the structure and material of the object. For an aluminum surface with 2 cm thickness, the resistance would be less than $10^{-5}$ Ohms.

The instantaneous current produced by the above voltage ($I = \Delta V/R$) will vary as the object moves through the earth's magnetic field. This variation is in response to the moving object having its velocity or dimension change with respect to its orientation with the earth's magnetic field. Thus, as the object moves, it will have a current flowing across it. This current will in turn have a magnetic field associated with it. The magnetic field is obtained from the following equation:

$$H_\phi = \frac{Il\, e^{-j\beta r} \sin\theta}{4\pi} \left( j\frac{\beta}{r} + \frac{1}{r^2} \right) \frac{\text{Amperes}}{\text{meter}} \quad (2)$$

where $\beta = \omega/c$ and $\omega$ is the angular frequency of the current I and c is the speed of propagation. Even for a direct current component, this field will be detectable at distances of tens of kilometers or more. This induced magnetic field is detected by the instant invention.

Alternatively, an object made of a magnetic material, for example iron or a ferrous coating, will concentrate magnetic flux in the presence of the earth's magnetic field. As this object moves through the earth's magnetic field, the inherent magnetic field of the object will cause a perturbation in the earth's magnetic field. This perturbation is similarly detected by the instant invention.

In both of these instances the induced magnetic field fluctuation will have several frequency components depending upon the rate of change of the orientation of the vehicle with respect to the earth's magnetic field. Additionally, there will be a magnetic field component with frequency U/l' due to the object passing over the sensor. Here, l' is the length of the object along the direction of motion U.

The electrically conducting object can also have a voltage induced from a time varying magnetic field, which is the first term of equation (1). The time varying magnetic field could be from geomagnetic fluctuations and micropulsations, low frequency signals generated from lightning discharges and a low frequency transmitter.

The present invention includes at least two magnetic field sensors 20, 22 spaced tens of kilometers apart, for detecting the perturbations in the earth's magnetic field. The magnetic field sensors can be embodied as magnetometers or superconducting quantum induction devices, having a sensitivity of about $10^{-10}$ Gauss/(Hz)$^{\frac{1}{2}}$. At least two such magnetic sensors 20, 22 are needed so that the ambient noise from the ionosphere and atmosphere can be filtered out in the central processor. Sensitivity of the system improves as the number of sensors increases because of better noise cancellation. With a plurality of sensors, the processing algorithm can study the temporal and spatial history of the target.

The output signals of the magnetic field sensors 20, 22 are coupled to analog to digital converters 30, 32 and digitized to data signals. The analog to digital converters 30, 32 are coupled to processors 40, 42 for generating Fourier transform data signals from the data signals. Processors 40, 42 are coupled to processor 50. Processor 50 can include an algorithm for performing a spatial complex Fourier transform or performing a cross correlation on the Fourier transform data signals from processors 40, 42. Processors 50, 40, 42 are coupled to subtracting and tracking unit 55 for subtracting the output of processor 50 from the outputs of processors 40, 42 to produce a signature data signal. The tracking algorithm of the subtracting and tracking unit 55 ensures the consistency of the signature data signal in terms of temporal and spatial movement of the target. Subtracting and tracking unit 55 is coupled to a display unit 60 for displaying the output signals from processor 50. The output signal from processor 50 can be selected from one of two options: either a ambiguity data signal or a cross-correlation data signal or coherence signal. The particular output display is operator selected, depending upon whether operator selectes processor 50 to perform a spatial Fourier transform or a cross-correlation.

Processors 40, 42, 50 can be embodied as one processing unit. For example, these processors can be a central processing unit. The central processing unit includes means for Fourier transforming or cross-correlating the two signals for the sensors.

Figure 2:
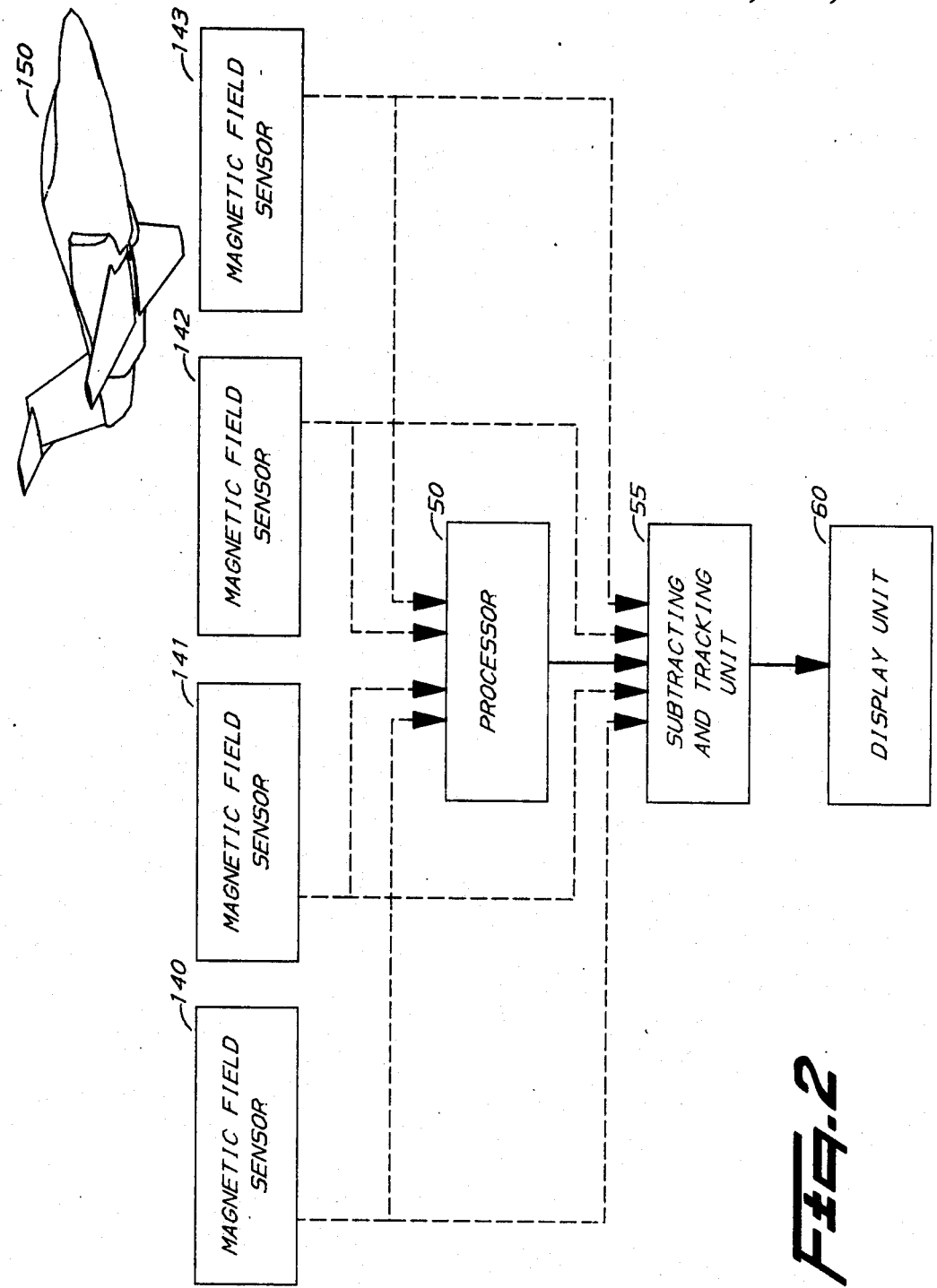
FIG. 2 is a block diagram of a plurality of magnetic field sensors.

The processor 50 for performing the complex Fourier transform or cross-correlation of the Fourier transform data signals and subtracting and tracking unit 55 are essential for the operation of this invention. The complex Fourier transform of the Fourier transform data signals is analogous to performing coherence function estimation. The sensitivities of the magnetic field sensors 20, 22 are very high and a substantial amount of ionospheric and atmospheric noise is added to the signals outputted from the magnetic field sensors 20, 22. FIG. 2 is a block diagram of a plurality of magnetic field sensors 140, 141, 142, 143. These sensors are the same as those in FIG. 1, with corresponding analog to digital converters and Fourier transform processors incorporated therein. These sensors might typically be spaced tens of kilometers from each other. The outputs from these magnetic field sensors are coupled to a processor 50 and subtracting unit 55. An electrically conducting object 150 is shown moving across sensor 143.

Figure 3:
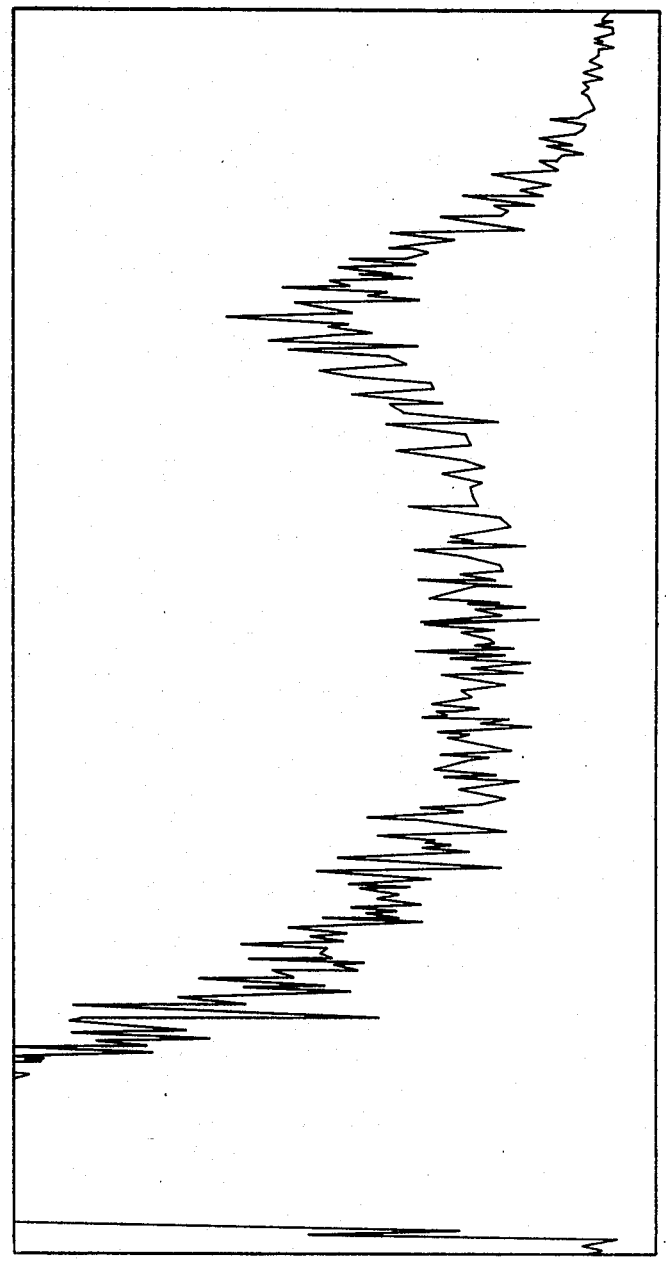
FIG. 3 illustrates an east-west component of the noise power spectrum in the 0-10 Hz band.
Figure 4:
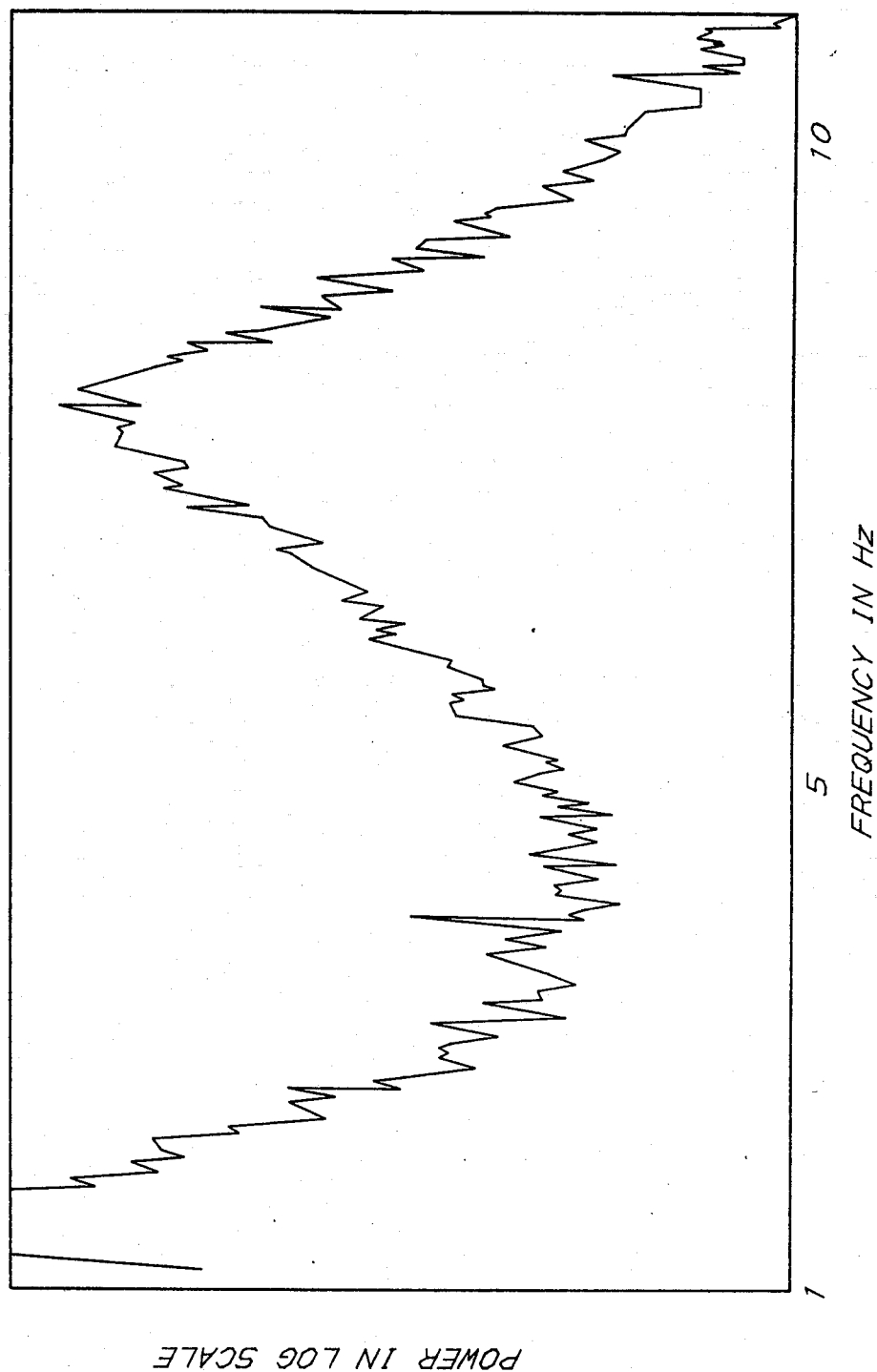
FIG. 4 illustrates a north-south component of the noise power spectrum in the 1-10 Hz band.

FIG. 3 and 4 illustratively show the noise power spectrum in the 0-10 Hz band outputted from the magnetic field sensors. FIG. 3 illustrates a measured east-west component of the noise where the vertical scale is linear in power and FIG. 4 illustates a measured north-south component of the noise where the vertical scale is the log of the power. Each figure shows peaks in the noise power spectrum occuring between 0-3 Hz and at greater than 5 Hz. The peak in noise power spectrum at greater than 5 Hz is due to the Schuman resonance of ionospheric signals in the earth ionospheric waveguide. The low frequency noise fluctuations between 0-3 Hz are due to ionospheric and magnetoshperic effects including micropulsations and ionospheric noise. Both peaks in the noise power spectrum at these frequencies have large spatial correlation wavelengths.

In the preferred embodiment of the present invention, at least two magnetic field sensors are required because the perturbations in the earth's magnetic field from the electrically conducting object detected by one sensor are very weak in comparison with the strength of the ambient noise. By having at least two magnetic fields sensors 20, 22 spaced tens of kilometers apart, the atmospheric and ionospheric noise detected by each magnetic field sensor is correlated because of the large spatial wavelength of the noise. Thus, the noise power spectrum is included in the output of processor 50.

The magnetic field sensors closest to the electrically conducting object will have in their output signals a signature signal due to perturbations in the earth's magnetic field. The signature signal is very weak and localized, and will not appear at the output from all of the sensors.

The signature signal can be filtered from the noise power spectrum by subtracting the correlated noise power spectrum from processor 50 from Fourier transform data signals derived from each magnetic field sensor, thereby producing a difference signal from each magnetic field sensor. The difference signal from the magnetic field sensor closest to the electrically conducting object will include the signature signal, thereby effecting detection of the electrically conducting object. The cross spectrum between the sensors is a determination of the ambient natural field. On the other hand, auto power spectrum is composed of the sum of the signal and noise power from the measurements of complex data signals from the sensors the coherence function estimation will yield determination of noise free signature data signal. A sample of a signature signal produced by aircraft is illustrated in FIG. 5 at approximately 6.25 Hz.

Accordingly, having at least two magnetic field sensors 20, 22 and a spatial Fourier transform or cross-correlation performed on the output signals from the magnetic field sensors to determine the coherence function is essential for eliminating a substantial amount of atmospheric and ionospheric noise. With an array of sensors, further improvements are made (1) through over determination of noise, and (2) the tracking of the temporal and spatial histories of the signature signals.

From the teachings of the present invention, it would be obvious that variations and extensions can be made from the claimed invention. For example, in a preferred embodiment, magnetic field sensors would be arranged in a matrix. The spacing between the individual magentometers would be determined by the overall sensitivity of the system. Additionally, the magnetic field sensors would have sufficient spacing from each other so that the atmospheric and ionospheric noise could be filtered using a spatial cross-correlation. The array configuration also allows the temporal and spatial histories of the target to be studied for consistency. This provides more efficient operation. Also, the processing units 40, 42, 50 would preferably be array processors performing the desired functions and computer with suitable algorithms.

It will be apparent to those skilled in the art that various modifications can be made to the apparatus for detecting electrically conducting objects moving in the earth's magnetic field of the instant invention without departing from the scope or spirit of the invention, and it is intended that the present invention cover modifications and variations of the system provided they come within the scope of the appended claims and their equivalents.

I claim:

1. An apparatus for detecting an electrically conducting object moving in the earth's magnetic field, comprising:

a first magnetic field sensor having a sensitivity of about $10^{-10}$ Gauss/(Hz)$^{\frac{1}{2}}$ responsive to perturbations in the earth's magnetic field from an induced magnetic field of a current flowing on the electrically conducting object caused by an induced potential across the electrically conducting object due to the velocity of the electrically conducting object moving in the earth's magnetic field and due to time varying components of the earth's magnetic field, for generating a first signal having amplitude and phase components;

a second magnetic field sensor spaced tens of kilometers from said first magnetic field sensor, having a sensitivity of about $10^{-10}$ Gauss/(Hz)$^{\frac{1}{2}}$ responsive to perturbations in the earth's magnetic field from the induced magnetic field of the current flowing on the electrically conducting object caused by the induced potential across the electrically conducting object due to the velocity of the electrically conducting object moving in the earth's magnetic field and due to time varying components of the earth's magnetic field, for generating a second signal having amplitude and phase components;

first and second analog to digital converters coupled to said first and second magnetic field sensors, respectively, for digitizing said first and second signals into first and second data signals, said first and second data signals having amplitude and phase components;

first and second means coupled to said first and second analog to digital converters, respectively, for generating first and second complex Fourier transform data signals from said first and second data signals, said first and second complex Fourier transform data signals having amplitude and phase components;

means coupled to said first and second generating means for spatially Fourier transforming said first and second complex Fourier transform data signals into a spatially correlated noise power data signal having amplitude and phase components versus frequency versus space;

means coupled to said spatially Fourier transforming means and said first and second generating means for subtracting said spatially correlated noise power data signal from said first and second complex Fourier transform data signals to produce a signature data signal; and means coupled to said subtracting means for displaying said signature data signal.

2. An apparatus for detecting an electrically and magnetically conducting object moving in the earth's magnetic field, comprising:

a first magnetic field sensor having a sensitivity of about $10^{-10}$ Gauss/(Hz)$^{\frac{1}{2}}$ responsive to perturbations in the earth's magnetic field from an induced magnetic field of a current flowing on the electrically conducting object caused by an induced potential across the electrically conducting object due to the velocity of the electrically conducting object moving in the earth's magnetic field and due to time varying components of the earth's magnetic field, for generating a first signal having amplitude and phase components;

a second magnetic field sensor spaced tens of kilometers from said first magnetic field sensor, having a sensitivity of about $10^{-10}$ Gauss/(Hz)$^{\frac{1}{2}}$ responsive to perturbations in the earth's magnetic field from the induced magnetic field of the current flowing on the electrically conducting object caused by the induced potential across the electrically conducting object due to the velocity of the electrically conducting object moving in the earth's magnetic field and due to time varying components of the earth's magnetic field, for generating a second signal having amplitude and phase components;

first and second analog to digital converters coupled to said first and second magnetometers, respectively, for digitizing said first and second signals into first and second data signals, said first and second data signals having amplitude and phase components;

first and second means coupled to said first and second analog to digital converters, respectively, for generating first and second complex Fourier transform data signals from said first and second data signals, said first and second complex Fourier transform data signals having amplitude and phase components;

means coupled to said first and second generating means for spatially cross-correlating said first and second complex Fourier transform data signals into a spatially correlated noise power data signal having amplitude and phase components versus frequency versus space;

means coupled to said spatially cross-correlating means and said first and second generating means for subtracting said spatially correlated noise power data signal from said first and second complex Fourier transform data signals to produce a signature data signal and for tracking temporal and spatial history of said signature data signal for consistency, said spatially cross-correlating means and subtracting means thereby performing a coherence function estimation; and means coupled to said subtracting and tracking means for displaying said signature data signal.

3. An apparatus for detecting an electrically conducting object moving in the earth's magnetic field, comprising:

a plurality of magnetic field sensors each having a sensitivity of about $10^{-10}$ Gauss/(Hz)$^{\frac{1}{2}}$ and spaced tens of kilometers apart, responsive to perturbations in the earth's magnetic field from an induced magnetic field of a current flowing on the electrically conducting object caused by an induced potential across the electrically conducting object due to the velocity of the electrically conducting object moving in the earth's magnetic field and due to time varying components of the earth's magnetic field, for generating a plurality of signals having amplitude and phase components;

a plurality of analog to digital converters coupled to said plurality of magnetic field sensors, respectively, for digitizing said plurality of signals into a plurality of data signals, said plurality of data siganls having amplitude and phase components;

means coupled to said plurality of analog to digital converters for generating a plurality of complex Fourier transform data signals from said plurality of data signals, respectively, said plurality of Fourier transform data signals having amplitude and phase components;

means coupled to said generating means for spatially cross-correlating said plurality of complex Fourier transform data signals into a spatially correlated noise power data signal having amplitude and phase components versus frequency versus space;

means coupled to said spatially cross-correlating means and said generating means for subtracting said spatially correlated noise power data signal from each of said complex Fourier transform data signals to produce a signature data signal and for tracking the temporal and spatial history of said signature data signal for consistency, thereby reducing noise and false detections; and means coupled to said subtracting and tracking means for displaying said signature data signal.

* * * * *